Z. W. BRITTON.
REVERSIBLE CLUTCH MECHANISM.
APPLICATION FILED JUNE 23, 1915.
1,189,049.
Patented June 27, 1916.
2 SHEETS—SHEET 2.
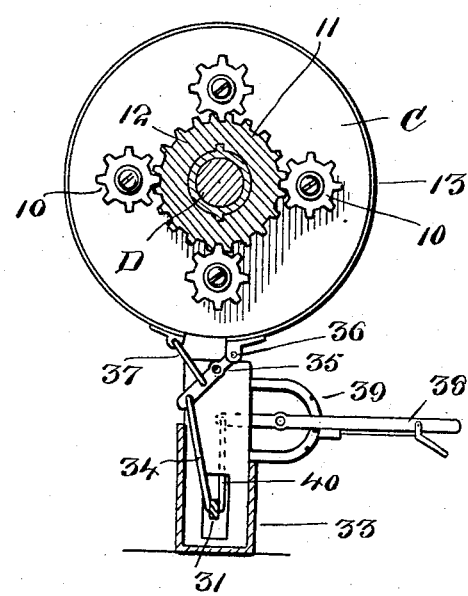
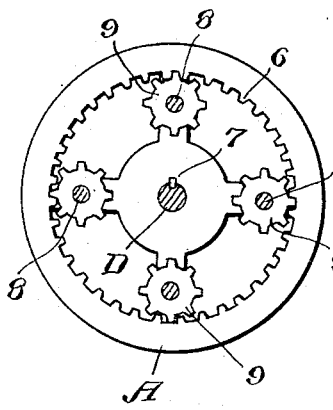
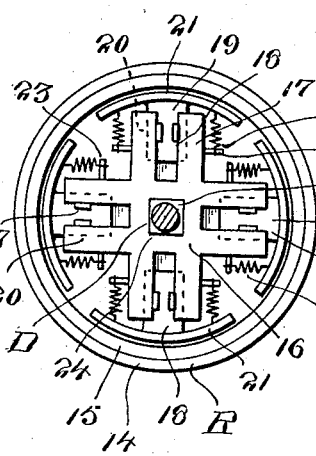
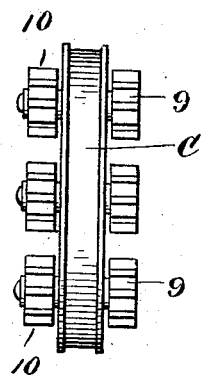
Witnesses
E. R. Ruppert
R. M. Briett
Inventor
Z. W. Britton
By Victor J. Evans
Attorney
THE COLUMBIA PLANOGRAPH CO., WASHINGTON, D. C.

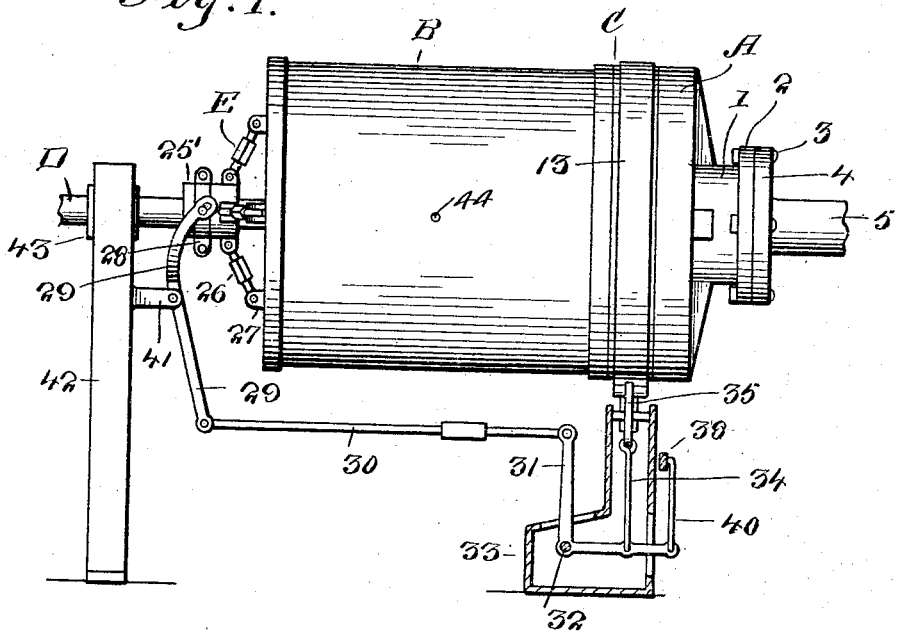

UNITED STATES PATENT OFFICE.

ZEBEDEE WARNER BRITTON, OF FAIRMONT, WEST VIRGINIA.

REVERSIBLE CLUTCH MECHANISM.

1,189,049.  Specification of Letters Patent.  Patented June 27, 1916.

Application filed June 23, 1915. Serial No. 35,925.

*To all whom it may concern:*

Be it known that I, ZEBEDEE WARNER BRITTON, a citizen of the United States, residing at Fairmont, in the county of Marion and State of West Virginia, have invented new and useful Improvements in Reversible Clutch Mechanism, of which the following is a specification.

This invention relates to reversible clutch mechanism, the broad object of the invention being to produce mechanism of the character referred to and especially designed for use in conjunction with internal combustion engines such as are now ordinarily employed in oil fields where a quickly reversible engine is now commonly used, the said reversible clutch mechanism embodying a minimum number of parts, eliminating a considerable amount of friction, being time saving in use and adapted to produce a more rapid driving of the driven element in one direction as compared with the other. Furthermore, by reason of the construction hereinafter described, the liability of the driven belt to become caught or jammed is entirely eliminated.

With the above and other objects in view, the invention consists in the novel construction, combination and arrangement of parts, as herein described, illustrated and claimed.

In the accompanying drawings:—Figure 1 is a view in elevation of the reversible clutch mechanism of this invention. Fig. 2 is a central longitudinal section through the same showing the main central shaft in elevation. Fig. 3 is a cross section on the line 3—3 of Fig. 2. Fig. 4 is a cross section on the line 4—4 of Fig. 2. Fig. 5 is a cross section on the line 5—5 of Fig. 2. Fig. 6 is an edge view of the pinions and pinion carrier.

The driving member of the reversible clutch mechanism is indicated at A, the driven member at B and the pinion carrier at C, said parts being arranged side by side as indicated in Figs. 1 and 2 and all mounted on the same central shaft D which also carries the clutch E hereinafter more particularly described.

The driving member A, in the preferred embodiment of the invention, has a hub 1 flanged as shown at 2 adapting the same to be fastened by bolts 3 to the flange 4 on one end of a driving shaft 5 which may consist of the crank shaft of an internal combustion engine. Said driving member A is in the form of an internal gear, the same being internally toothed as at 6 to mesh with one set of pinions on a pinion carrier to be described. The driving member A is keyed or otherwise fastened to the shaft D as indicated at 7 and therefore the member A always drives the shaft D in the same direction.

The pinion carrier C is shown as comprising a disk shaped body having journaled therein a circular series of pinion shafts 8. On each of the shafts 8 there are mounted two pinions 9 and 10 both of which have a fixed relation to the shaft 8 so as to turn simultaneously therewith. The pinions 9 mesh with the teeth 6 of the internal gear or driving member A, motion being thus imparted to the pinions 9 and consequently to the pinions 10 at the opposite side of the pinion carrier.

The pinions 10 mesh with and drive a spur gear 11 having a fixed relation to the body or hub 12 of the driven member B which is shown in the form of a drum or belt pulley. In order to render the mechanism just described operative, some means must be provided for holding the pinion carrier C stationary. This is accomplished by means of a friction band or strap brake 13 which is received in the grooved or channeled periphery of the pinion carrier as shown in Fig. 2, means being hereinafter described for tightening and loosening the band 13 and thereby holding and releasing the pinion carrier.

The end of the drum B opposite the pinion carrier C is rabbeted at 14 and a friction shoe 15 is fastened therein in any suitable manner, said friction shoe being of any suitable material such as wood which may be replaced at small expense. At the same end of the drum B, there is mounted the clutch E which is shown as comprising a spider or body 16 having radially extending arms 17 formed with radial slots 18 in which are slidable the inwardly extending shanks 19 which are guided by grooves 20 in the arms 17, said shanks carrying at their outer extremities friction shoes 21 adapted to bear against the inner face of the annular shoe 15 as shown in Figs. 2 and 5. The shoes 21 are drawn inwardly by means of contractile springs 22 which are fastened at 23 to the arms 17. The center of the body or spider 16 is formed with a non-circular opening 24 to fit upon a correspondingly shaped portion 25 of the shaft D. Therefore, the clutch body 16 always revolves with the shaft D.

A collar or yoke 25′ is mounted to slide on the shaft D and is connected by links 26 to arms or lugs 27 on the clutch shoes so that when the collar 25′ is slid back and forth on the shaft D, the clutch shoes 21 are thrown into and out of driving engagement with the annular friction shoe 15 of the driven member B. The links 26 are shown in the form of turn buckles so that the throw of the shoes 21 may be regulated. The collar 25′ is grooved to receive a shifting ring 28 to which is connected a shifting fork 29 connected by a longitudinally extensible link or rod 30 to a bell crank lever 31 fulcrumed at 32 within or upon a suitable support 33 as shown in Fig. 1. The rod 30 is connected to one arm of the lever 31, the other arm of said lever being connected by a link 34 to a brake band lever 35, one of the extremities of the brake band 13 being connected to one end of the lever 35 at 36 and the other end of said brake band being connected by a link 37 to the lever 35 at a point distant from the connection 36. The bell crank lever 31 is operated by means of a thumb latch lever 38 held in any desired position by a rack 39 and connected by a link 40 to said bell crank lever. The fork 29 is shown as pivotally mounted on a bracket or arm 41 of a bearing post 42 supporting a bearing 43 for the shaft D. The drum B is provided with oil passages 44.

In operation, by moving the lever 38 in one direction, the brake band 13 is released and the clutch E is set or thrown into operation so as to drive the drum B in the same direction and at the same speed as the shaft D. By moving the lever 38 in the opposite direction, the clutch E is released thus freeing the drum B and the brake band 13 is set or tightened around the pinion carrier whereupon the driving member A drives the pinions 9 and 10 which in turn drive the spur gear 11 and the driven member or drum B in a direction the reverse of the shaft D and at a much greater speed. It will thus be seen that the lever 38 controls both the brake band 13 and the clutch E, first throwing one of said members out of operation and then throwing the other member into operation. In other words, the driven member B is first released as to its driving connection with the shaft and is then immediately thereafter reëngaged with and driven by the shaft D in the opposite direction. In this way a quick reversible clutch mechanism is provided embodying a minimum number of parts, a consequent reduction of friction or bearing surfaces and valuable time is saved in the reversing operation. Furthermore, there is no possibility of the driving belt getting into the mechanical parts of the reversible clutch mechanism.

What I claim is:—

1. In reversible clutch mechanism the combination of a rotary shaft, an internal gear fast on said shaft and constituting the driving member of the mechanism, a drum normally loose on the shaft and constituting the driven member, a spur gear having a fixed relation to said drum, a pinion carrier loose on said shaft, the side faces of the marginal portions of the pinion carrier being sustained between and by the adjacent faces of the corresponding portions of the driving and driven members, pinions journaled on said carrier and adapted to transmit motion from the internal gear to said spur gear, an external contracting band movable into engagement with the periphery of said pinion carrier for holding the said pinion carrier stationary and releasing the same, and a clutch operable to connect and disconnect said shaft and drum.

2. In reversible clutch mechanism, the combination of a rotary shaft, an internal gear fast on said shaft and constituting the driving member of the mechanism, a drum normally loose on the shaft and constituting the driven member, a spur gear having a fixed relation to said drum, a pinion carrier loose on said shaft and interposed between the driving and driven members, the side faces of the marginal portions of the pinion carrier being sustained between and by the adjacent faces of the corresponding portions of the driving and driven members, pinion shafts journaled in said carrier, pinions fast on opposite ends of each pinion shaft, the pinions on one side of the carrier receiving motion from the driving member, and the pinions on the other side of the carrier imparting motion to the driven member, an external contracting band movable into engagement with the periphery of said pinion carrier for holding the said pinion carrier stationary and releasing the same, and a clutch operable to connect and disconnect said shaft and clutch.

In testimony whereof I affix my signature in presence of two witnesses.

ZEBEDEE WARNER BRITTON.

Witnesses:
C. O. BATSON,
EVERETT D. GERWIG.

Copies of this patent may be obtained for five cents each, by addressing the "Commissioner of Patents, Washington, D. C."